United States Patent
Kosik et al.

[11] Patent Number: 6,042,503
[45] Date of Patent: Mar. 28, 2000

[54] APPARATUS FOR ACTUATING TORQUE TRANSMITTING SYSTEMS

[75] Inventors: Franz Kosik, Ostfildern; Bernd Koch, Backnang; Michael Salecker, Bühl; Martin Zimmermann, Sasbach, all of Germany

[73] Assignees: LuK Getriebe-Systeme GmbH, Bühl/Baden; Mercedes Benz Aktiengesellschaft, Stuttgart, both of Germany

[21] Appl. No.: 08/856,231

[22] Filed: May 14, 1997

[30] Foreign Application Priority Data

May 14, 1996 [DE] Germany ............................ 196 19 348

[51] Int. Cl.[7] .................................................. B60K 41/28

[52] U.S. Cl. ............................................... 477/78; 477/86

[58] Field of Search .................................. 477/77, 78, 79, 477/80, 81, 83, 86, 99; 180/271, 281

[56] References Cited

U.S. PATENT DOCUMENTS

| | | | |
|---|---|---|---|
| 3,860,904 | 1/1975 | Anderson | 180/287 X |
| 5,005,680 | 4/1991 | Satoh et al. | 477/78 X |
| 5,064,039 | 11/1991 | Otsuka et al. | 477/86 |
| 5,454,768 | 10/1995 | Jones et al. | 477/99 X |
| 5,679,091 | 10/1997 | Salecker et al. | 477/86 |
| 5,682,790 | 11/1997 | Genise | 477/78 |
| 5,755,639 | 5/1998 | Genise et al. | 477/111 |

*Primary Examiner*—Khoi Q. Ta
*Attorney, Agent, or Firm*—Darby & Darby

[57] ABSTRACT

There are disclosed a method of and an apparatus for automated actuation of a friction clutch or another torque transmitting system in the power train of a motor vehicle. An actuator for the torque transmitting system can be rendered operative by the ignition key and/or as a result of one or more activities of the operator of the motor vehicle prior or subsequent to insertion of the ignition key. The activity or activities can include the engagement of a brake, the shifting of a transmission lever, stepping on the gas pedal and/or others.

73 Claims, 5 Drawing Sheets

APPARATUS FOR ACTUATING TORQUE TRANSMITTING SYSTEMS

BACKGROUND OF THE INVENTION

The present invention relates to improvements in methods of and in apparatus for actuating torque transmitting systems in the power trains of motor vehicles. The torque transmitting systems adapted to be actuated in accordance with the method and by the apparatus of the present invention can constitute friction clutches or other types of clutches including magnetic powder clutches and hydrokinetic torque converters with bypass or lockup clutches.

More particularly, the invention relates to improvements in methods of and in apparatus for automated actuation of torque transmitting systems (hereinafter called clutches for short) in power trains of the type wherein a clutch can be utilized to transmit torque from a prime mover (such as an internal combustion engine) to a manual, automated or automatic transmission or from the transmission to one or more driven units.

It is known to actuate a clutch in the power train of a motor vehicle by resorting to an arrangement (herein-after called actuator) which receives signals from one or more sensors and/or electronic circuits and employs an actor (e.g., a hydraulic actor utilizing a master cylinder and a slave cylinder) which transmits motion to the actual clutch engaging and disengaging means, e.g., to the resilient tongues or prongs of a diaphragm spring in a friction clutch wherein the diaphragm spring can be caused to urge a pressure plate toward an engine-driven counterpressure plate so that the two plates clamp the friction linings of a clutch disc which serves to transmit torque to the input shaft of a manually or otherwise operated transmission when the clutch is engaged. The actor at least partially engages or disengages the clutch in response to signals from the sensor or sensors and/or from the electronic circuit or circuits.

It is also known to design the actuator in such a way that it becomes operative in response to turning on of the ignition system for the engine of a motor vehicle, and it is equally known to provide a motor vehicle with means for reliably holding a parked or otherwise stored or idled vehicle against undesired rolling movements, e.g., during parking on a sloping surface on a road or in a garage. For example, certain vehicles are provided with safety systems which ensure that the clutch is automatically engaged when the actuator is inoperative so that the turned off engine acts as a brake in that it opposes rotation of the clutch disc in response to the tendency of the vehicle wheels to roll along an incline. When the ignition system for the engine is turned on, the actuator for the clutch becomes operative.

As a rule, the operator of a vehicle will use one and the same hand first to insert the ignition key in order to render the actuator operative, to thereupon manipulate a lever in order to shift the transmission from a forward or rearward gear into neutral, and to thereafter turn the ignition key in order to start the engine. Such mode of operation with one hand provides a considerable amount of safety but is not overly convenient to the operator of the motor vehicle.

OBJECTS OF THE INVENTION

An object of the invention is to provide a novel and improved method of and a novel and improved apparatus for actuating the torque transmitting systems (such as friction clutches) in the power trains of motor vehicles.

Another object of the invention is to provide a method and an apparatus which are just as safe as heretofore known methods and apparatus but are more convenient to the operator of the motor vehicle.

A further object of the invention is to provide an apparatus which is relatively simple and compact, which can be produced, assembled and installed at a reasonable cost, and which can be put to use in many types of motor vehicles.

An additional object of the invention is to provide a versatile apparatus which is designed to automatically actuate a torque transmitting system in dependency upon any one or two or more of a substantial number of variables which can affect the safety of a motor vehicle during parking on any terrain as well as in actual use of the motor vehicle.

Still another object of the invention is to provide a novel and improved actuator for automated engagement or disengagement of a torque transmitting system in the power train of a motor vehicle.

A further object of the invention is to provide a power train wherein the torque transmitting system (such as a friction clutch between an internal combustion engine and a manual, automated or automatic transmission) is automatically actuatable in accordance with the improved method.

SUMMARY OF THE INVENTION

One feature of the instant invention resides in the provision of an apparatus for automated actuation of a torque transmitting system (such as a friction clutch) in a power train forming part of a multiple-condition motor vehicle and further including a prime mover (such as an internal combustion engine) and a transmission (e.g., a manually manipulatable transmission having a plurality of gears (e.g., a neutral gear, a reverse gear and several forward gears) and a lever or other suitable means for shifting into a selected gear). The apparatus comprises a signal-receiving actuator for the torque transmitting system (herein-after called clutch) having an operative condition and an inoperative condition. The apparatus further comprises means for operating the actuator, and such operating means can comprise at least one first unit (e.g., a unit including one or more switches, one or more digital or analog sensors and/or one or more electrical or electronic circuits) serving to generate and to transmit to the actuator first signals denoting a change in the condition of the motor vehicle (e.g., whether the ignition system for the engine of the motor vehicle is on or off). The means for operating the actuator further comprises at least one second unit which serves to generate and to transmit to the actuator second signals denoting an activity of the operator of the motor vehicle. The second unit or units can also comprise one or more switches and/or one or more analog or digital sensors and/or one or more electrical or electronic circuits.

As mentioned above, the at least one first unit can include or constitute or form part of one or more switches, sensors and/or circuits, e.g., an ignition switch which must be turned on or off by the operator of the motor vehicle by using a key; the first signals can denote that the ignition switch is turned on.

The at least one second unit can include a switch which generates second signals denoting that a brake of the motor vehicle is being operated by the operator of the vehicle.

The actuator can include means (such as a mechanical or a fluid-operated actor) for actuating the clutch (such as closing or engaging the clutch) to transmit torque from the prime mover to the transmission or from the transmission to one or more driven units (e.g., to a differential) in response to the generation and transmission of second signals.

The actuator can include means (such as the aforementioned actor) for actuating the clutch only in response to the reception of at least one first signal and/or at least one second signal, e.g., at least one second signal.

It is often preferred to design the at least one second unit in such a way that it can generate and transmit to the actuator (e.g., to an electronic signal analyzing circuit of the actuator) second signals which at least indirectly pertain to the transmission. Thus, the aforementioned means for shifting the transmission into a selected gear can assume a plurality of different positions each of which is indicative of one of the different gears, and the at least one second unit can include means (e.g., one or more digital and/or analog sensors) for monitoring the positions of the shifting means and for generating second signals denoting the monitored position of the shifting means. The means for shifting can be responsive to the (direct or indirect) application of a variable force, and the at least one second unit can comprise means (e.g., one or more switches, sensors or circuits) for monitoring the variable force and for generating second signals which denote the magnitude of the monitored force. Such signals can indicate an operator's intent to shift or not to shift into a selected gear. For example, the at least one second unit can include at least one sensor which is designed and positioned and set up to generate second signals denoting the selected gear; the actuator can control the clutch in such a way that the latter is set up to transmit torque when the transmission is shifted into a specific gear (e.g., into neutral gear).

The activity of the operator of the motor vehicle can constitute or involve or be indicative of an intention of the operator to shift the transmission, and the actuator of such apparatus can include means for disengaging the clutch in response to the generation of a second signal (e.g., a signal denoting that the transmission is about to be shifted from neutral into rearward or into a forward gear).

The at least one second unit can include at least one sensor which is operative to transmit at least one second signal denoting an activity of the operator regardless of whether the actuator is then maintained in the operative or in the inoperative condition.

In accordance with a presently preferred embodiment, the actuator can be rendered operative only in response to the generation of at least one second signal and becomes inoperative in response to termination of the generation of such second signal or signals.

Still further, the actuator can be rendered operative in response to the generation of at least one second signal and remains operative for an interval of time following the termination of generation of such second signal(s). This interval can have a predetermined duration.

The at least one second component can include a signal generating component (such as a standard electric switch) which is responsive to the actuation of a brake (such as a parking brake or a pedal-operated standard brake) by the operator of the motor vehicle.

The at least one second unit can also include a signal generating component which constitutes or which is responsive to the actuation by the operator of a switch denoting the position of a mobile door of the motor vehicle, a change in the condition of an activatable and deactivatable alarm system in the vehicle, a change in the condition or position of a seat in the vehicle, changes in the position of a mobile gas pedal of the vehicle, changes in the condition of at least one adjustable light of the vehicle, changes in the condition of a headlamp flasher in the vehicle, changes in the condition of a horn in the vehicle, changes in the condition of a wireless system (radio) in the vehicle, and/or changes in the position and/or condition of one or more other operator-controlled constitutents of the motor vehicle.

The apparatus can be constructed and assembled in such a way that the means for rendering the actuator for the clutch operative includes a unit arranged to generate and to transmit to the actuator signals denoting a turning off of the ignition system of the motor vehicle, and means for maintaining the actuator in the operative condition during an interval of finite length or duration following the generation of a signal. The clutch can be an engageable and disengageable friction clutch with an axially movable pressure plate, a magnetic powder clutch or a hydrokinetic torque converter with a so-called bypass clutch or lockup clutch. The signal generating unit can include one or more switches, sensors and/or circuits, and the actuator can be arranged to automatically assume or reassume its inoperative condition when the aforementioned interval has elapsed.

The apparatus can be constructed and assembled in such a way that the means for rendering the actuator for the clutch operative includes a unit which is designed to generate and to transmit to the actuator signals of finite duration or length; such signals denote an activity of the operator of the motor vehicle, and the means for rendering the actuator operative further comprises means for maintaining the actuator in the operative condition only for the duration of the signal. As already pointed out hereinbefore, the system which is associated with such actuator can include at least one engageable and disengageable clutch (such as a friction clutch), and the unit can include one or more sensors, switches and/or circuits.

The means for rendering the actuator operative (so that the actuator can engage or disengage a clutch or another torque transmitting system) can include a unit which is arranged to generate and to transmit to the actuator signals denoting an activity of the operator of the motor vehicle, and means for maintaining the actuator in the operative condition during an interval of finite length following the generation of a signal. The clutch can constitute a friction clutch, and the unit can comprise one or more sensors (e.g., one or more switches) and/or electric or electronic circuits.

The means for rendering the actuator operative can also comprise at least one unit which is arranged to generate and to transmit to the actuator first and second signals denoting first and second activities of the operator of the motor vehicle, and means for maintaining the actuator in the operative condition for an interval of limited duration in response to the generation of a first signal and in the absence of generation of a second signal during such interval.

Still further, the means for rendering the actuator operative can include a unit which is designed to generate and to transmit to the actuator signals denoting the selected gear of the transmission, and means for maintaining the actuator in the operative condition (in which the torque transmitting system is engaged) in response to a signal denoting a selected transmission gear other than neutral and for maintaining the actuator in the inoperative condition (in which the torque transmitting system is disengaged) in response to a signal denoting that the selected gear is the neutral gear of the transmission.

It is also possible to design the means for operating the actuator in such a way that it includes a unit serving to generate and to transmit to the actuator signals denoting the extent of movement of the shifting means by the operator of the motor vehicle, means for analyzing the signals to ascertain whether or not the extent of movement of the shifting means is indicative of an intent by the operator to shift the transmission into a different gear, and means for maintaining the actuator in the operative condition for an interval of finite length when an analyzed signal is indicative of an intent to shift the transmission into a different gear. The actuator in arranged to effect a disengagement or opening of the torque transmitting system (such as a friction clutch) at least during a portion of the aforementioned interval when the analyzed signal is indicative of the operator's intent to shift the transmission into a different gear.

Still further (and when the transmission is designed in such a way that the manipulation of the shifting means to shift the transmission into a selected gear necessitates the application of a force having a predetermined magnitude), it is also possible to design the means for operating the actuator in such a way that it includes at least one unit serving to generate and to transmit to the actuator signals denoting the magnitude of the force being applied by the operator to the shifting means, means for analyzing the signals to ascertain whether or not the magnitude of the applied force at least matches the predetermined magnitude, and means for maintaining the actuator in the operative condition for an interval of finite length or duration when an analyzed signal denotes a force having a magnitude at least matching the predetermined magnitude. The actuator is set up to effect a disengagement of the torque transmitting system at least during a portion of the aforementioned interval when the analyzed signal is indicative that the magnitude of the applied force at least matches the predetermined magnitude.

Still further, the apparatus can be designed in such a way that the means for operating the actuator includes at least one unit serving to generate and to transmit to the actuator signals which denote the movement of the shifting means (by the operator of the motor vehicle). The actuator is responsive to such signals after the elapse or expiration of a predetermined interval of signal generation.

In accordance with another presently preferred embodiment, the means for operating the actuator can include at least one unit which is designed to generate and to transmit to the actuator signals which denote the magnitude of the force being applied to the shifting means of the transmission by the operator of the vehicle. The actuator is responsive to such signals after the elapse or expiration of a predetermined interval of the generation of a signal. Shifting of the transmission into a selected gear necessitates the application to the shifting means of a force having a predetermined magnitude.

Still further, the means for operating the actuator can include at least one unit which serves to generate and to transmit to the actuator first signals denoting that gear which has been selected by the operator of the motor vehicle as a result of manipulation of the shifting means, and second signals denoting the existence of an intent on the part of the operator to shift into a selected gear. The actuator is set up to disengage or open the torque transmitting system in response to second signals when the first signal then being transmitted to the actuator denotes that the selected gear is a gear (an additional gear) other than neutral.

It is also possible to construct and assemble the means for operating the actuator in such a way that it includes at least one first unit serving to generate and to transmit to the actuator first signals denoting a turning off of the ignition system, and at least one second unit serving to generate and to transmit to the actuator second signals which denote an activity of the operator of the motor vehicle. The actuator is designed to assume or to remain in the operative condition during a first interval of time following the generation of a first signal, and to assume or to remain in the operative condition during a second interval of time following the generation of a second signal. The duration of one of the intervals is or can be different from that of the other interval.

Still further, the means for operating the actuator can include a plurality of units each of which is arranged to generate and to transmit to the actuator signals denoting a different activity of the operator of the motor vehicle. The actuator is or can be arranged to assume or remain in one of the two (operative and inoperative) conditions for one of a plurality of intervals of time following the generation of a signal by one of the units. The intervals can have identical or different durations. The actuator can remain in a predetermined one of the two (operative and inoperative) conditions in response to the generation of a signal by any one of the plurality of units. It is also possible that the actuator assume or remain in the operative condition in response to the generation of a signal by one of the units, and to assume or remain in the inoperative condition in response to the generation of a signal by another unit.

The means for operating the actuator can also comprise at least one first unit which serves to generate and to transmit to the actuator first signals denoting a change in the condition of the vehicle (such as a change in the ignition system for the engine of the motor vehicle), and at least one second unit which serves to generate and to transmit to the actuator second signals denoting an activity of the operator of the motor vehicle. The actuator is set up to maintain the torque transmitting system in the engaged (closed) condition after the elapse of an interval of finite length or duration following the generation of one of the (first and/or second) signals, and to become inoperative after the elapse of such interval.

It is also possible to construct and assemble the means for operating the actuator in such a way that it comprises at least one first unit serving to generate and to transmit to the actuator first signals denoting a change in the condition of the motor vehicle, and at least one second unit arranged to generate and to transmit to the actuator second signals which denote an activity of the operator of the motor vehicle. The actuator is constructed and assembled to maintain the torque transmitting system in the engaged or closed condition after the elapse of an interval of finite length following the generation of one of the signals and to automatically become inoperative after the elapse or expiration of such interval.

The actuator can include a computer and can be provided with means for storing information as well as with means for retrieving stored information.

Another feature of the invention resides in the provision of a method of utilizing or manipulating an apparatus which is designed for automated actuation of a torque transmitting system in a power train forming part of a multiple-condition motor vehicle and further including a prime mover and a transmission. The apparatus further includes a signal-receiving actuator for the torque transmitting system (the system can include a friction clutch or another clutch such as a magnetic powder clutch or a hydrokinetic torque converter with a bypass or lockup clutch), and the actuator can be caused to assume an operative condition or an inoperative condition. The method comprises the steps of rendering the actuator operative in response to a first signal which denotes a change in the condition of the motor vehicle (such as a change in the condition of the ignition system for the engine), and rendering the actuator operative in response to one or more second signals denoting one or more activities of the operator of the motor vehicle.

An activity of the operator can involve a manipulation of the transmission.

In addition to the aforementioned change in the condition of the motor vehicle, the change can include at least one of: actuation of the horn of the motor vehicle, actuation of one or more light emitting devices for illumination of the interior of the vehicle or for illumination of the road, actuation of an alarm system designed to generate visible, audible and/or other signals, actuation of a brake, actuation of the gas pedal, actuation of a device for monitoring the position of a mobile door and/or seat of or in the motor vehicle, actuation of a wireless communication system (e.g., a radio or a telephone set), and actuation of a device for monitoring a headlamp flasher in the motor vehicle.

The method can further comprise the step of maintaining the actuator in the operative condition for a predetermined interval of time upon generation of one of the (first and second) signals.

Still further, the method can comprise the step of rendering the actuator inoperative after the elapse or expiration of a predetermined interval of time following the generation of a first signal or a second signal.

The novel features which are considered as characteristic of the invention are set forth in particular in the appended claims. The improved apparatus itself, however, both as to its construction and its mode of operation and the method of utilizing or manipulating the same, together with numerous additional important features and advantages thereof, will be best understood upon perusal of the following detailed description of certain presently preferred specific embodiments with reference to the accompanying drawings.

DESCRIPTION OF PREFERRED EMBODIMENTS

Figure 1:
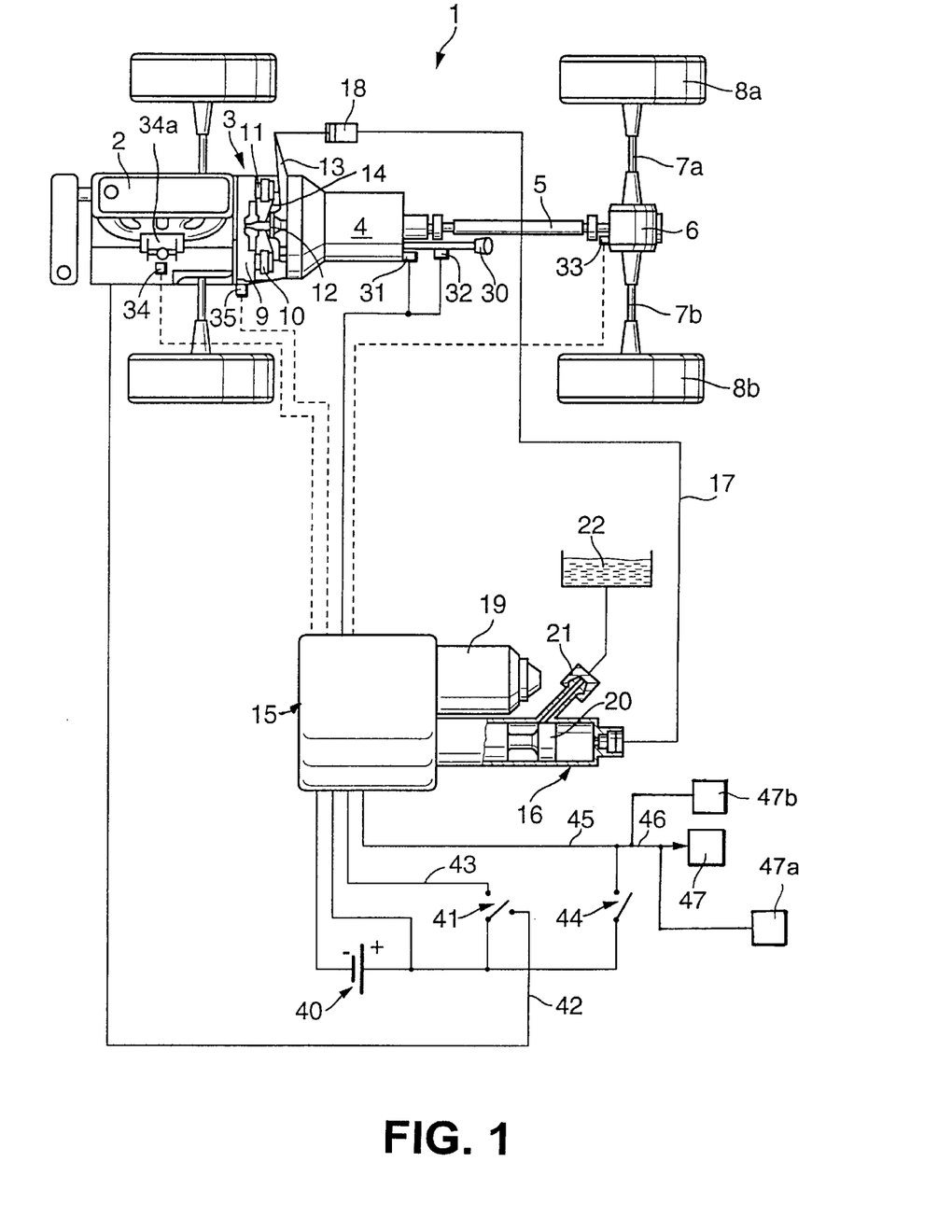
FIG. 1 is a schematic plan view of certain constituents of a motor vehicle wherein a friction clutch between an engine and a transmission is actuated by an apparatus embodying one form of the present invention.

Referring first to FIG. 1, there are shown certain relevant parts of a motor vehicle 1 having a power train including a prime mover 2 (such as an internal combustion engine or a hybrid drive employing an electric motor, hereinafter referred to as engine for short), a torque transmitting system 3, and a manual transmission 4. A drive shaft 5 normally receives torque from the transmission 4 and serves to drive a differential 6 which, in turn, drives the axles 7a, 7b for the wheels 8a, 8b, respectively.

The illustrated torque transmitting system 3 is a friction clutch having a flywheel 9 which is normally driven by an output element of the engine 2 and constitutes the counter-pressure plate of the clutch 3. The latter further comprises an axially movable pressure plate 10, a clutch disc 11 having friction linings engageable by the plates 9 and 10 and a hub arranged to transmit torque to the input shaft of the transmission 4, a clutch spring 14 (such as a diaphragm spring which urges the pressure plate 10 toward the counterpressure plate 9 when the clutch 1 is engaged, and a release bearing 12 which can be moved axially to disengage the clutch. The means for moving the release bearing 12 comprises a fork 13 forming part of an actor which further includes a fluid-operated motion transmitting arrangement and forms part of a clutch actuating apparatus 15 (hereinafter called actuator) having an operative condition and an inoperative condition.

The fluid-operated motion transmitting arrangement of the actor which is shown in FIG. 1 further comprises a master cylinder 16, a slave cylinder 18 coupled to the fork 13, and a conduit 17 for a pressurized fluid (such as a hydraulic fluid) connecting the master cylinder 16 with the slave cylinder 18.

The actuator 15 further comprises an electric motor 19 which is operatively connected with the piston 20 of the master cylinder 16 by a suitable transmission (not referenced). The fork 13 is a lever which can be pivoted in a first direction to disengage the friction clutch 3, and in a second direction to enable the spring 14 to engage or close the clutch.

The actuator 15 further comprises an electronic circuit (to be described with reference to FIG. 2); such circuit includes a power unit and a control or regulating unit. The actor comprises a customary shifting valve 21 which can connect the master cylinder 16 with a source 22 of hydraulic fluid. Though the electronics are shown as being integrated into the housing of the actuator 15, it is also possible to install the electronics in a separate enclosure.

Friction clutches which can be actuated by the apparatus of the present invention are disclosed, for example, in U.S. Pat. No. 4,901,596 granted Feb. 20, 1990 to Wolfgang Reik et al. for "Assembly for taking up and compensating for torque-induced shocks" and in U.S. Pat. No. 5,135,092 granted Aug. 4, 1992 to Johann Jäckel for "Apparatus for transmitting torque". The disclosures of these patents are incorporated herein by reference.

The transmission 4 is equipped with a lever 30 which can be manipulated by the operator of the motor vehicle 1 to shift into a selected gear (e.g., a neutral gear or one of additional gears including a reverse gear and several forward gears).

The means for operating the actuator 15 in order to engage (close) or disengage (open) the friction clutch 3 comprises several units in the form of digital or analog sensors (including switches) and/or electrical or electronic circuits. Such units (hereinafter primarily referred to as switches or sensors) transmit to the electronics of the actuator 15 different types of signals pertaining to activities of the operator and/or to the condition of the motor vehicle 1. In FIG. 1, the sensors include a first sensor 31 which is designed to transmit to the actuator 15 signals denoting the selected gear of the transmission 4, a second sensor 32 which is associated with the shifting lever 30 and can generate and transmit signals denoting the intent (or the absence of intent) by the operator to shift the transmission 4 from or into a particular gear, at least one sensor 33 for the generation and transmission of signals denoting the RPM of the shaft 5 and/or axles 7a, 7b and/or wheels 8a, 8b, a sensor 34 which generates and transmits signals denoting the position of a throttle valve 34a for the engine 2, and a sensor 35 which generates and transmits signals denoting the RPM of the engine 2.

The sensor 31 is designed to monitor the positions of internal components of the transmission 4 and/or directly the selected gear of the transmission, i.e., the signals from the sensor 31 to the signal processing or analyzing circuitry of the actuator 15 denote at least the selected gear of the transmission 4. If the sensor 31 is an analog sensor, it can transmit signals which are indicative of the monitored or detected movement(s) of one or more internal components of the transmission 4; this enables the circuitry of the actuator 15 to rapidly ascertain the next selected gear by interpreting signals which indicate the direction of movement of one or more internal components.

The actuator 15 receives energy from a suitable source 40 (e.g., a car battery). As can be seen in FIG. 1, the current-consuming parts of the actuator 15 are permanently connected or connectable to the two poles of the energy source 40.

FIG. 1 further shows an ignition switch 41 (e.g., a multi-stage switch) which can be turned on or off by a car key (not shown). When the switch 41 is closed (or when the mobile contact of this switch assumes a predetermined position), the circuit of the ignition system (not specifically shown in FIG. 1) for the engine 2 is completed via conductor 42.

A conductor 43 connects the ignition switch 41 with the circuitry of the actuator 15. The arrangement is such that the actuator 15 is rendered operative when the ignition switch 41 is closed.

FIG. 1 further shows a switch (sensor) 44 which is also actuated in response to a specific activity of the operator of the motor vehicle 1, for example, when the operator depresses a brake pedal or pulls a brake actuating member by hand. The closed switch 44 then generates and transmits to the actuator 15 a signal by way of a conductor 45. The closing of the switch 44 can further result in the transmission to the actuator 15 of one or more signals via conductors 45, 46. FIG. 1 shows schematically a brake light 47 which is turned on in response to closing of the switch 44 (i.e., in response to depression of a brake pedal).

When the ignition switch 41 is off but the operator closes the switch (sensor) 44 by way of a brake actuating element (such as brake pedal or the like), the actuator 15 is rendered operative even though the ignition system of the engine 2 is off; the circuit of the actuator 15 is then completed via conductor 45. In other words, the actuator 15 can change the condition of the friction clutch 3 even though the engine 2 is not running. Thus, the actuator 15 can disengage the clutch 3 in time, namely while the engine is idle.

The fluid-operated actor including the cylinders 16 and 18 constitutes but one of several means which can be resorted to for the transmission of motion from the actuator 15 to the means for engaging and disengaging the friction clutch 3. For example, one can also resort to a purely mechanical actor, and such actor can be directly or indirectly coupled to the fork 13 or to the bearing 12, e.g., by way of a link train, by a Bowden wire or in any other suitable way.

FIG. 1 shows that a closing of the switch (sensor) 44 can result in the transmission to the actuator 15 (via conductors 45, 46) of signals from one or more additional components which are directly or indirectly controlled by the operator of the motor vehicle 1. Such additional components include a vehicle alarm system 47a and a central locking system 47b. Those are but two examples of numerous operator-controlled vehicle parts which can transmit signals to the actuator 15 to indicate one or more specific activities of the operator. It is also possible to provide one or more additional switches or sensors (corresponding to 44) which are to be manipulated by the operator (either directly or indirectly, e.g., by opening or closing a door (see the switch 5) or occupying or leaving a seat) in order to transmit to the actuator 15 one or more signals independently of the momentary position or condition of the ignition switch 41.

Figure 2:
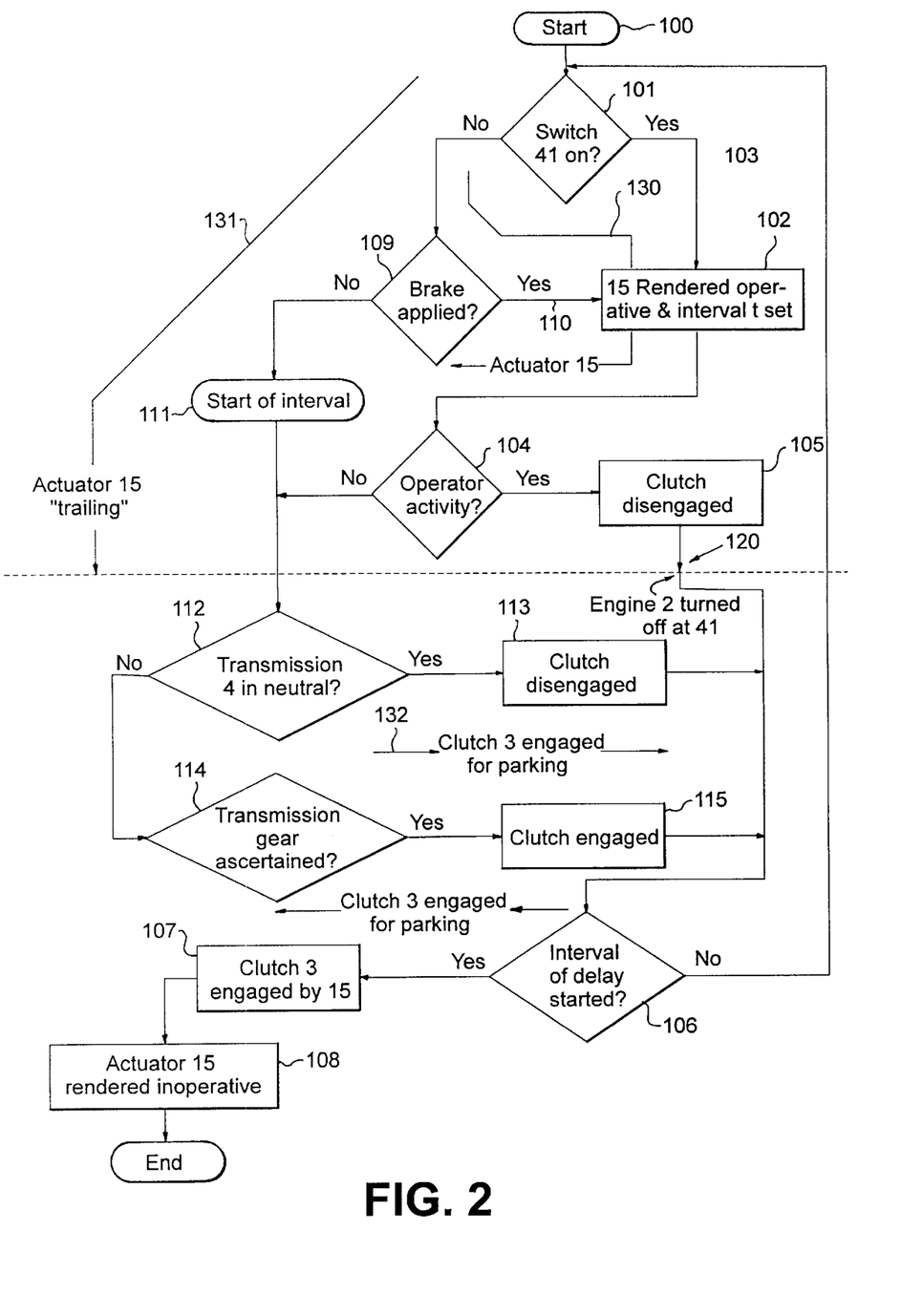
FIG. 2 is a block diagram representing several modes of operating the clutch actuating apparatus in the motor vehicle of FIG. 1.

The block diagram or flow chart of FIG. 2 illustrates one presently preferred routine which can be carried out by the actuator 15 in the motor vehicle 1 of FIG. 1, i.e., the steps of one presently preferred method which can be practiced by resorting to such actuator.

The routine is started at 100, and the block 101 is indicative of the step of ascertaining whether or not the ignition switch 41 is on. If the switch 41 is on, the branch 103 of the circuitry in the actuator 15 is effective to render the actuator operative (as at 102) for a preselected interval of time. The block 104 denotes the step of ascertaining the presence or absence of an intent by the operator of the motor vehicle 1 to shift the transmission 4 into a particular gear and, if the answer is in the affirmative, the friction clutch 3 is disengaged (as denoted by the block 105) or is not engaged to thus ensure that the operator can shift the transmission into a selected gear. From there on, the vehicle 1 is operated in a standard fashion, i.e., the operator can shift the transmission 4 into or from a desired or required gear to drive the vehicle forwardly or backwards and at a desired speed.

When the engine 2 is turned off by way of the ignition switch (at 120), this starts an interval (shown at 106) which must elapse before the friction clutch 3 is engaged by the actuator 15 (at 107), and the actuator is thereupon rendered inoperative (e.g., turned off as at 108). This completes a standard routine.

If the monitoring at 101 indicates that the ignition switch 41 is off, the operator can proceed to actuate a brake (at 109 in the flow chart of FIG. 2) to thus render the actuator 15 operative because the actuator receives a corresponding signal via conductor 45 as a result of closing of the switch 44. The actuator 15 is then rendered operative by way of a branch 110 pointing to the afore discussed block 102.

If the brake is not actuated (i.e., if the switch 44 is not closed), this initiates the setting of a predetermined time interval (denoted by the block 111). If no intent to shift into a different gear is recognized within such interval (111) but the transmission 4 is in neutral gear (note the block 112), the clutch 3 is disengaged (as at 113). If the transmission 4 is in a gear (such as a first, second, third, fourth or fifth forward gear or the reverse gear) other than neutral (see the block 114), the clutch 3 is engaged at 115. Such engagement of the clutch 3 is intended to block any undesired rolling of the vehicle wheels, e.g., while the vehicle is parked on a sloping surface in a garage or elsewhere.

If the transmission 4 is in neutral gear (see the block 112), the friction clutch 3 is disengaged (at 113). This is based on the premise or assumption that the operator is about (i.e., that she or he intends) to shift into a gear other than neutral while the motor vehicle 1 is being parked and before the operator leaves the vehicle, i.e., that the operator desires to prevent an unintentional rolling of the vehicle wheels while the engine 2 is off. If no such undertaking is carried out by the operator within the interval denoted by the block 111 (i.e., if the operator failed to manipulate the lever 30 so that no intention to shift is indicated at 104), the clutch 3 is engaged after the elapse or toward the end of the predetermined interval (111) and the actuator 15 is rendered inoperative before the routine is terminated.

The arrow 130 in the flow chart of FIG. 2 is indicative of that routine of rendering the actuator 15 operative which is carried out when the actuator was inoperative, e.g., during and/or following a typical parking procedure.

The arrow 131 indicates a shadowing or trailing of the actuator; such mode of operation of the actuator is selected for the event that the actuator was rendered operative due to a certain activity of the operator, such as the transmission of a signal from the sensor 32, but this certain activity was not followed by any further activity. As already described above, this entails that the actuator 15 remains operative for a certain interval of time to be rendered inoperative (such as automatically) upon elapse or expiration of such interval. The inactivation of the actuator 15 is again preceded by an automatic engagement of the friction clutch 3 (as indicated by the arrow 132) unless the operator selects to proceed differently.

The block 109 shows, merely by way of example, that a brake (note the switch 44) can be utilized as a means for generating a wake-up signal (light 47) as an indication that the actuator 15 is operative. As already mentioned above and as shown in FIG. 1 at 47, 47a and 47b, it is possible to use various operator-initiated signals to render the actuator 15 operative, such as the actuation of the alarm system, the turning on of the brake light, a depression of the gas pedal (switch 34), or any other signal or signals which are designed to indicate an activity on the part of an operator of the motor vehicle.

Figure 3:
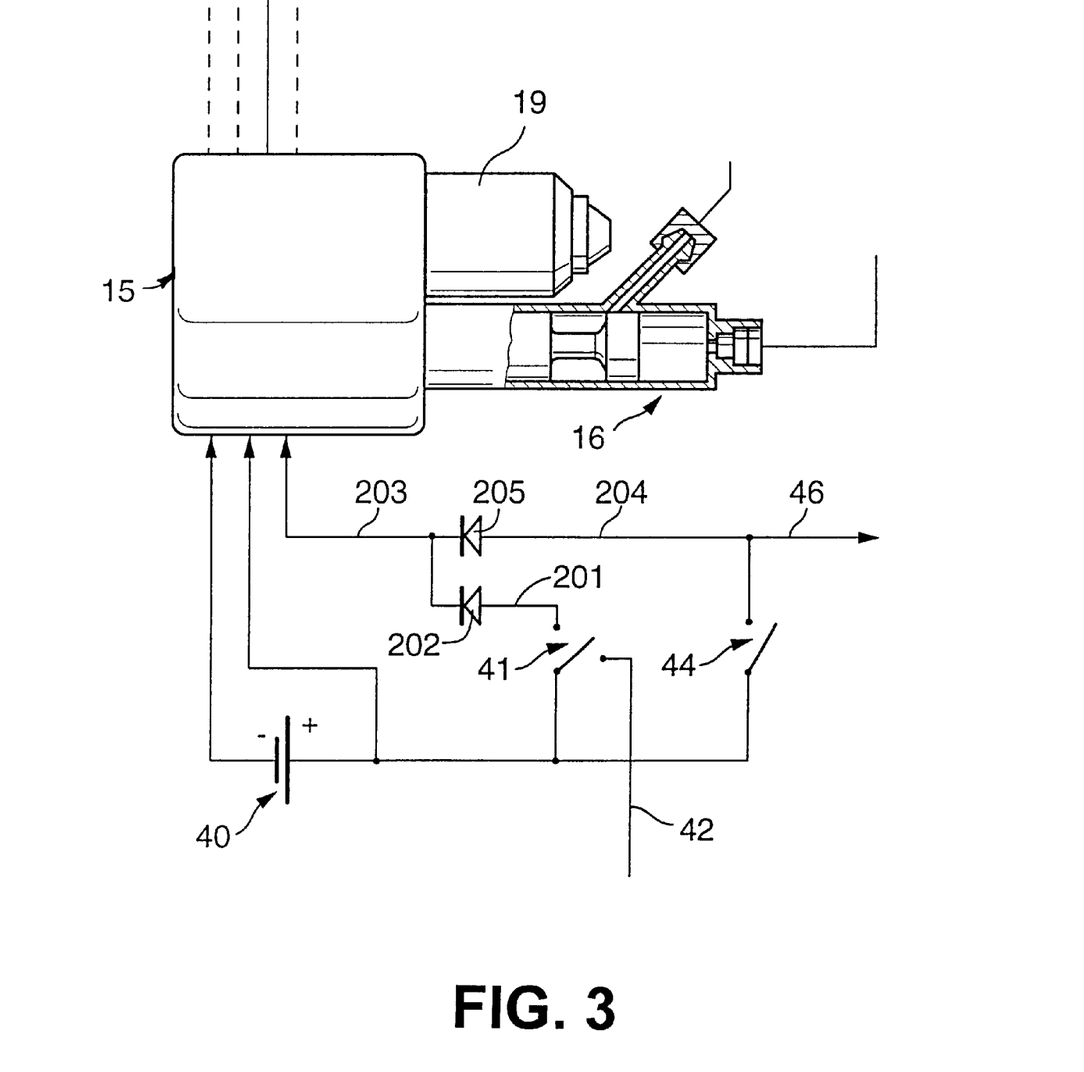
FIG. 3 is a fragmentary partly elevational, partly sectional and partly schematic view of a modified apparatus.

FIG. 3 shows a portion of an actuator 15 which receives signals denoting certain activities of the operator of the motor vehicle (not shown in FIG. 3) in a manner different from that described in connection with FIG. 1. The actuator 15 of FIG. 3 also comprises a fluid-operated actor including an electric motor 19 and a master cylinder 16, and the electrical and/or electronic components of the actuator circuit receive energy from a battery 40. The connection from the ignition switch 41 to the actuator 15 comprises conductors 201 (containing a diode 202) and 203 (containing a diode 205). A conductor 204 connects one terminal of the switch (sensor) 44 with the conductor 203 and with a conductor 46 (the latter serves or can serve the same purpose as the similarly referenced conductor shown in FIG. 1). The circuitry of FIG. 3 is such that the actuator 15 can receive only one signal (via conductor 203) at a time, such signal being transmitted to render the actuator operative. The conductor 42 leads to the ignition system for the engine (not shown in FIG. 3).

Figure 4:
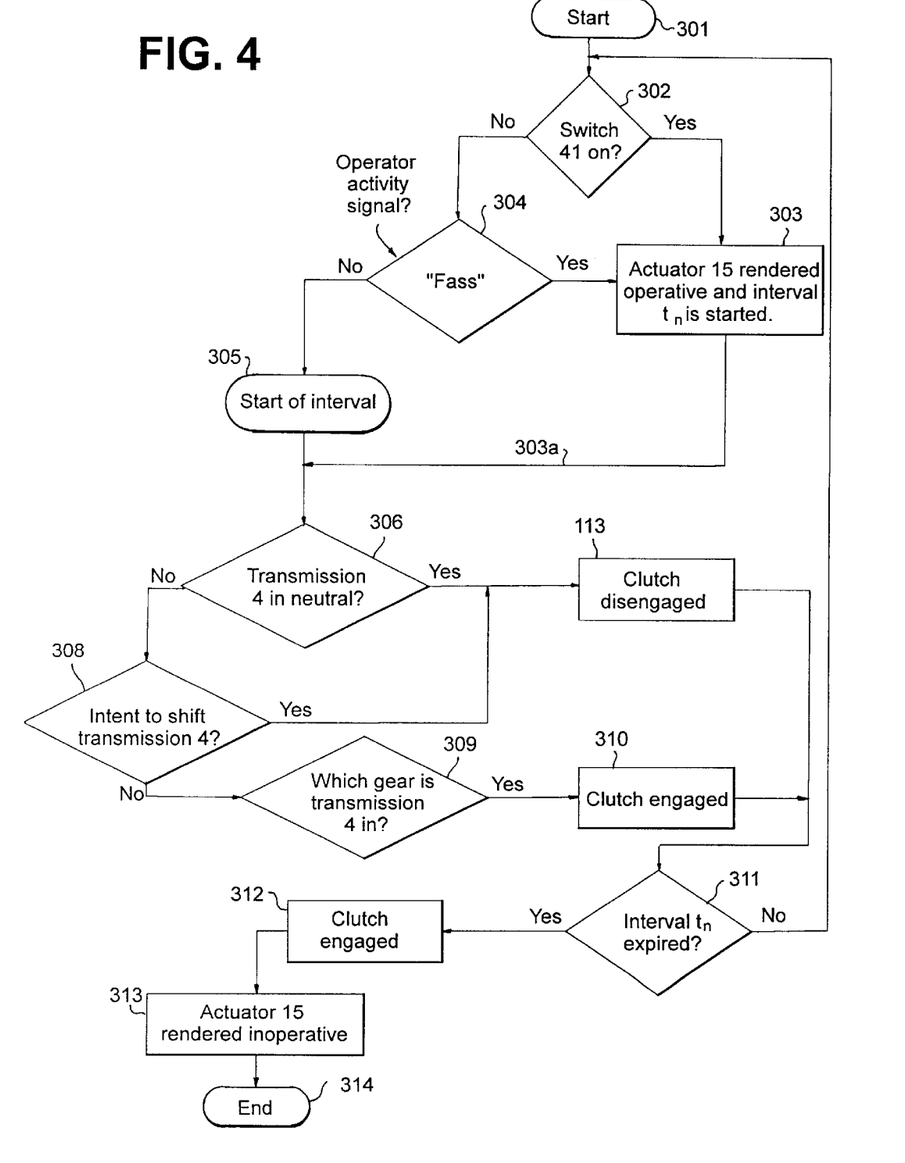
FIG. 4 is a block diagram representing different modes of operating an apparatus which embodies the present invention.

Referring now to FIG. 4, there is shown a flow chart or block diagram representing a routine which departs from that shown in FIG. 2. The modified routine is started at 301. The block 302 denotes the step of ascertaining whether or not the ignition switch 41 is closed. If the switch 41 is closed, the actuator 15 is rendered operative at 303 for an interval $t_n$ of predetermined duration. The reference character 303a denotes a determination of the condition of the transmission 4, i.e., of the then selected gear of the transmission.

If the monitoring at 302 indicates that the ignition switch 41 is off, the operator activity is ascertained at 304 (the letters "FASS" are intended to denote "driver activity sensor signal"). Such signal is being transmitted when one or more sensors detect an operator activity; for example, the sensor 31 and/or 32 can transmit one or more signals denoting one or more activities which affect the condition of the transmission 4.

If a "FASS" signal is present at 304, the actuator 15 is rendered operative at 303 and the aforementioned interval $t_n$ is set; the routine then proceeds as indicated by the arrow 303a. If no signal ("FASS") is present at 304, at least a portion of the interval $t_n$ elapses at 305. Once at least a portion of the interval $t_n$ has elapsed at 305, the sensor 31 and/or 32 (or another suitable sensor in the form of an analog or digital sensor or switch or a circuit) ascertains (at 306) the condition of the transmission 4, namely whether or not the transmission is in neutral gear. If the transmission 4 is in neutral, the friction clutch 3 is disengaged (opened) at 307. The next step involves a determination (at 311) whether or not the interval $t_n$ has elapsed.

If the step denoted by the block 306 indicates that the transmission 4 is not in neutral, or if this step does not furnish an indication pertaining to the condition of the transmission 4, the next step involves a determination (at 308) by one or more sensors whether or not the operator of the motor vehicle intends to carry out a gear shifting operation. If the answer is in the affirmative, the clutch 3 is disengaged at 307 and the routine denoted by the flow chart of FIG. 4 proceeds in a manner as already described hereinbefore.

If the monitoring at 308 indicates that no intent to shift the transmission 4 into a particular gear has been determined, the next step involves a determination (at 309) of the then active gear of the transmission, and the friction clutch 3 is engaged (closed) at 310. The block 311 indicates the next step, namely a determination whether or not the interval $t_n$ has elapsed. If the answer is no, the procedure reverts to the block 302. However, if the interval $t_n$ has elapsed, the clutch 3 is engaged at 312, the actuator 15 is rendered inoperative at 313, and the routine is terminated at 314.

Figure 5:
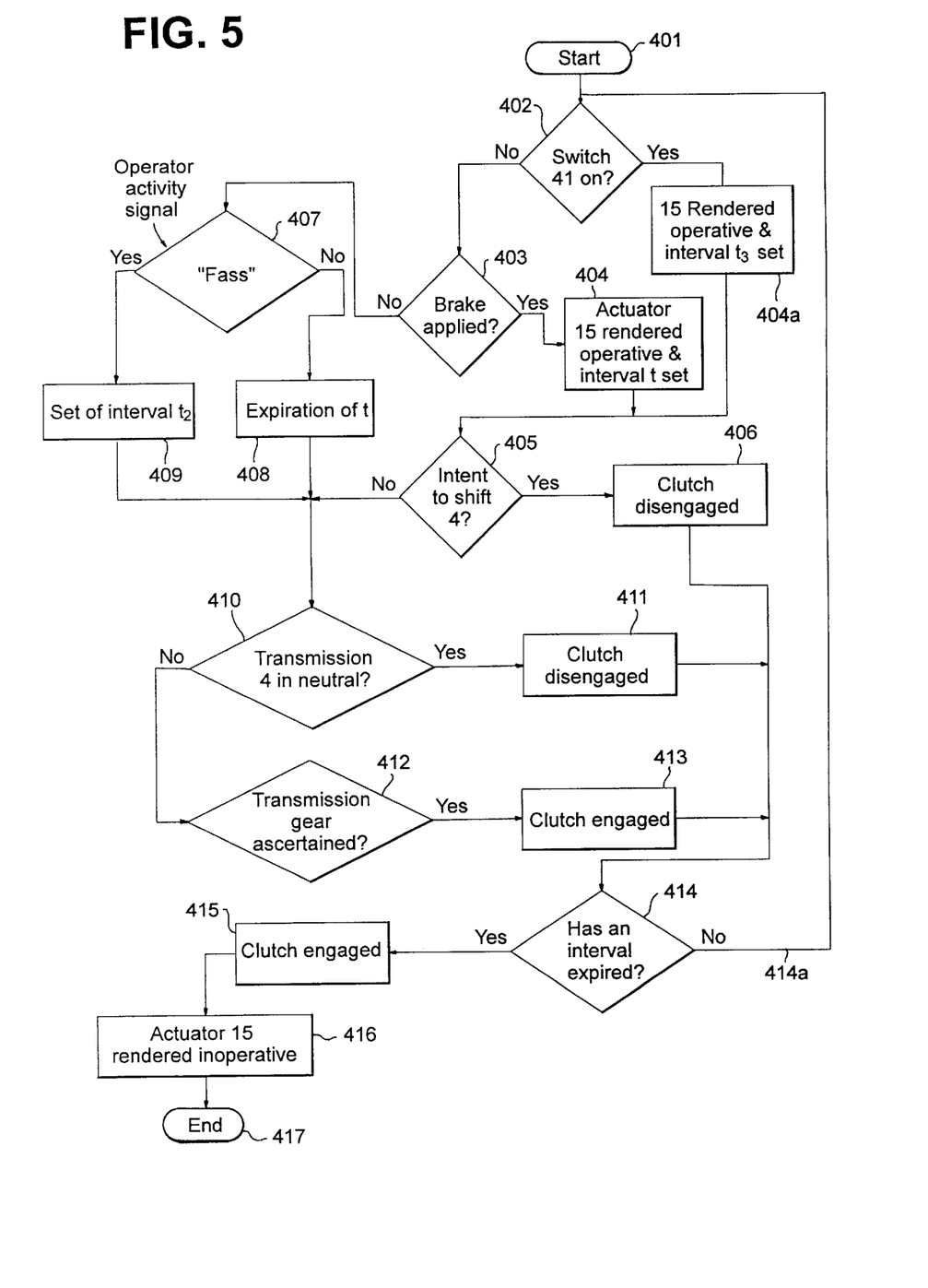
FIG. 5 is a further block diagram.

The flow chart of FIG. 5 illustrates the steps of a further routine which is started at 401. The block 402 denotes the step of ascertaining the setting of the ignition switch 41. If the switch 41 is closed, the actuator 15 is rendered operative at 404a, and a first interval $t_3$ is started. The block 405 denotes the next step, namely that of ascertaining the existence or non-existence of an intent to shift the transmission 4 into a particular gear.

If the monitoring at 402 indicates that the ignition switch 41 is off, the next step (shown at 403) involves a determination whether or not a brake (such as a parking brake or a standard vehicle brake) is being actuated (this can be ascertained by monitoring the position or condition of the switch (sensor) 44). If a brake is being operated, the actuator 15 is rendered operative at 404, and a second interval $t_1$ is set to begin.

The block 405 denotes a determination as to whether or not the operator of the motor vehicle 1 intends to shift the transmission 4. If the signal at 405 indicates the detected existence of an intent to shift, the friction clutch 3 is disengaged at 406. The block 414 indicates the step of determining whether or not an interval has elapsed. If such is not the case, the routine reverts to the block 402 (see the arrow 414a).

If an interval has elapsed, the friction clutch 3 is engaged at 415 and the actuator 15 is thereupon rendered inoperative (as at 416) before the routine is terminated at 417.

If the monitoring at 403 indicates that no brake is being operated, a determination is made at 407 for the presence or absence of a "FASS" signal. If the answer is yes, an interval $t_2$ is set to begin at 409. If there is no "FASS" signal at 407, the interval or intervals $t_2$, $t_1$ and/or $t_3$ elapses or elapse, at least in part (note the block 408), and the routine thereupon proceeds to the step indicated by the block 410, and from there to 411 or 412, 413.

The duration of one or more aforementioned intervals t can vary within a narrow or within a wide range, such as between 0.1 second and one or more hours.

An important advantage of the afore described method and apparatus is that they can reliably prevent any unintentional or non-contemplated rolling of the wheels of a motor vehicle which employs or embodies the improved apparatus. This is due to the fact that the actuator 15 can be rendered operative while the ignition is off, i.e., while the engine is still idle. For example, all that is necessary to render the actuator 15 operative is to actuate the gear shifting lever 30 of the transmission 4, at least to an extent which is necessary to ascertain or determine the existence of an intention to shift; this suffices to render the actuator 15 operative so that the actuator can disengage the friction clutch 3 preparatory to shifting of the transmission 4 into a selected gear.

If the ignition switch is turned on immediately by an ignition key, the starter of the combustion engine is ready for operation to start the engine.

The vehicle 1 can reach a condition in which it is ready for use when the actuator 15 is fully or at least partially functional. However, and as already fully described hereinbefore, it is also possible to render the actuator 15 operative in response to a determination of the existence of a signal denoting an activity on the part of the operator of the motor vehicle, for example, when the operator has actually operated a brake.

An intent by the driver to actually initiate or carry out an operation of one or more constituents of the motor vehicle can involve any one of a plurality of activities, such as the actuation of a lever (e.g., the lever 30), depression of a knob to thus close a switch (such as the switch 41) or the like. Furthermore, the actuator 15 can be rendered operative in response to two or more different activities by the operator of the motor vehicle, for example, stepping on a brake pedal and closing the ignition switch 41. Any one of two or more activities can result in operativeness of the actuator 15 so that its actor is ready to actuate a friction clutch or another torque transmitting system in an optimum manner.

As also described hereinbefore, a signal denoting an intention on the part of the operator to carry out one or more operations, such as shifting the transmission into a different gear, can be ignored if an analysis of such signal or signals (e.g., generated and transmitted by the sensor 31 and/or 32) indicates that the intention is not sufficiently pronounced, clear-cut or unequivocal to warrant further consideration. For example, the extent of shifting of the lever 30 by the operator might not be sufficiently pronounced and/or the magnitude of the force being applied to such lever in a sense to shift into or from a particular transmission gear need not rise to a value which is indicative of an unequivocal intent to perform an activity pertaining to the setting or a change of the setting of the transmission. Under such circumstances, the detected signal indicating an intent on the part of the operator of the motor vehicle to carry out one or more activities can be disregarded.

The operator of the motor vehicle can carry out one or more activities while the actuator 15 is inoperative. It is often advisable and beneficial that such activity or activities by the operator be monitored by one or more sensors and that such sensors transmit signals at the time when the actuator is inoperative or still inoperative.

The arrangement can be such that the actuator 15 is or can be rendered operative or can remain operative only in response to reception of one or more signals denoting the carrying out of one or more activities by the operator, and that the actuator becomes inoperative upon termination of transmission thereto of one or more signals denoting one or more activities by the operator. Alternatively, the actuator can remain operative for a selected interval of time subsequent to termination of the activity or activities by the operator or even for an indefinite or extended period of time. It is presently preferred to select an interval of predetermined but variable duration.

An activity of the operator of the motor vehicle can involve a manipulation of the antitheft alarm system (switch 47a); such manipulation can involve turning the alarm system on and/or deactivating the alarm system.

The actuator can remain operative for a preselected interval of time following the turning off of the ignition switch 41. The next step can involve rendering the actuator inoperative, e.g., in a fully automatic way.

The actuator can also receive signals from other electronics, such as engine electronics, and the actuator can remain operative only for the duration of generation and transmission of one or more signals denoting one or more activities by the operator of the motor vehicle. However (and as already described hereinbefore), it is equally within the purview of the invention to maintain the actuator in the operative condition for a fixed or variable (short, very short, long or even very long) interval of time following the termination of the signal or signals denoting one or more activities by the operator. For example, the actuator can remain operative for a fixed interval of time, and the setting of such interval can be ignored if a fresh signal denoting an activity of the operator is generated and transmitted to the actuator prior to expiration of the selected or set interval. The condition of the friction clutch or another torque transmitting system can remain unchanged during the aforementioned interval. Alternatively, the operation of the actuator can be such that the clutch is engaged or remains engaged if the transmission is in a gear other than neutral, and that the clutch is disengaged or remains disengaged if the transmission is in neutral. Furthermore, the clutch can be disengaged or can remain disengaged if one or more sensors generate and transmit to the actuator one or more signals denoting an intent on the part of the operator to shift into a different gear during the aforementioned interval or intervals. Again, it is possible to operate in such a way that the clutch is disengaged or remains disengaged only if an analysis of the just mentioned signal or signals indicates that there is a genuine intention to shift the transmission into a different gear and/or to carry out another activity, such as actuate a brake pedal, operate the ignition switch and/or others.

Still further, it is possible to select the operation of the improved apparatus in such a way that the movements of and/or the application of forces to the lever 30 can be disregarded during the aforementioned interval or intervals, i.e., the sensor 31 and/or 32 can be turned off or the signals (if any) transmitted by such sensor or sensors to the actuator 15 during the aforementioned interval or intervals be interpreted as too weak for consideration or as non-existent.

Still further, it is possible to select the mode of operation of the actuator 15 or an equivalent actuator in such a way that the signals denoting an intention by the operator to carry out one or more activities during the aforementioned interval(s) be considered except when the transmission is already shifted into a particular gear or when the transmission is in neutral.

It is also possible to consider signals denoting an intention by the operator during the aforementioned interval or intervals only if such signal or signals do not indicate an intention to actuate the switch 41 and if the transmission is in a gear other than neutral. The just mentioned interval or intervals can be set to begin in response to opening of the ignition switch 41.

As also mentioned hereinbefore, the apparatus can be constructed, adjusted and assembled in such a way that a predetermined interval is set following the generation and transmission to the actuator 15 of two or more different (second) signals denoting different activities by the operator of the motor vehicle. The predetermined intervals may but need not have identical durations; for example, each interval can have a different duration or at least two intervals can have identical or substantially identical durations. Furthermore, the functionality of the actuator may but need not be unchanged during each of two or more intervals, i.e., during intervals of duration or following the termination of two or more different signals denoting different activities by the operator of the motor vehicle.

Referring again to FIG. 1, the character 55 denotes the aforementioned switch or sensor which indicates the position of a door forming part of the motor vehicle, and the character 56 denotes the aforementioned switch (sensor) which indicates whether or not a particular seat (such as the driver's seat) is occupied. A switch (sensor) 57 is caused to transmit to the actuator 15 a signal when the operator changes the position of the gas pedal of the motor vehicle, and a switch 58 is caused to generate a signal in response to changes in the condition of a headlamp flasher. A further sensor or switch 59 serves to transmit signals when the operator of the vehicle actuates the horn.

The switch or sensor which indicates the condition of the wireless communication system (radio) is part of the electric circuitry of the actuator 15; the same holds true for the means for storing and retrieving signals.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of actuating torque transmitting systems in the power trains of motor vehicles and, therefore, such adaptations should and are intended to be comprehended within the meaning and range of equivalence of the appended claims.

What is claimed is:

1. Apparatus for automated actuation of a torque transmitting system in a power train forming part of a multiple-condition motor vehicle and further including a prime mover and a transmission, comprising a signal-receiving actuator for said system, said actuator including an electric circuit and having an operative condition and an inoperative condition; and operating means for said actuator, including at least one first unit arranged to generate and to transmit to said actuator first signals denoting a change in the condition of the motor vehicle, and at least one second unit arranged to generate and to transmit to said actuator second signals denoting an activity of an operator of the motor vehicle, said actuator being arranged to assume said operative condition from an inoperative condition in response to the generation by said at least one second unit of second signals.

2. The apparatus of claim 1, wherein said torque transmitting system includes an engageable and disengageable friction clutch.

3. The apparatus of claim 1, wherein at least one of said units includes at least one sensor.

4. The apparatus of claim 1, wherein at least one of said units includes at least one circuit.

5. The apparatus of claim 1, wherein the motor vehicle includes an ignition system for said prime mover and said ignition system is arranged to be turned on and off by the operator of the motor vehicle, said at least one first unit including means for generating first signals denoting the turning on of said ignition system.

6. The apparatus of claim 1, wherein the motor vehicle has at least one engageable and disengageable brake and said at least one second unit includes means for generating second signals in response to engagement of said at least one brake.

7. The apparatus of claim 1, wherein said actuator further includes means for actuating said system to transmit torque from one of said prime mover and said transmission in response to said second signals.

8. The apparatus of claim 1, wherein said actuator further includes which part of the system only in response to the reception of at least one of said first and second signals.

9. The apparatus of claim 8, wherein said at least one of said first and second signals is a second signal.

10. The apparatus of claim 1, wherein said transmission is operable to assume a selected one of a plurality of different conditions and said at least one second unit is arranged to generate second signals pertaining to at least one selected condition of said transmission.

11. The apparatus of claim 10, wherein said transmission has a plurality of different gears and includes means for shifting into selected gears, said shifting means having a plurality of different positions each of which is indicative of one of said different gears and said at least one second unit including means for monitoring the positions of said shifting means and for generating second signals denoting the monitored position of said shifting means.

12. The apparatus of claim 10, wherein said transmission has a plurality of different gears and includes means for shifting into selected gears in response to the application of a variable force by the operator of the vehicle, said at least one second unit including means for monitoring said variable force and for generating second signals denoting the magnitude of the monitored force.

13. The apparatus of claim 10, wherein said transmission is shiftable into a plurality of gears and includes means for shifting into a selected gear, said at least one second unit including at least one sensor arranged to generate second signals denoting the selected gear and said system being actuated to transmit torque when said transmission is shifted into a specific one of said plurality of gears.

14. The apparatus of claim 1, wherein said system includes an engageable and disengageable clutch and said transmission is shiftable into a plurality of different gears, said activity including an intention by the operator of the motor vehicle to shift said transmission and said actuator further including means for disengaging said clutch in response to the generation of a second signal.

15. The apparatus of claim 1, wherein said at least one second unit includes at least one sensor which is operative to transmit at least one second signal denoting an activity of the operator of the motor vehicle in the operative and inoperative conditions of said actuator.

16. The apparatus of claim 1, wherein said actuator is rendered operative only in response to the generation of a second signal and becomes inoperative in response to termination of the generation of such second signal.

17. The apparatus of claim 1, wherein said actuator is rendered operative in response to the generation of a second signal and remains operative for an interval of time following the termination of generation of such second signal.

18. The apparatus of claim 17, wherein said interval has a predetermined duration.

19. The apparatus of claim 1, wherein said at least one second unit includes at least one signal generating component which is a digital sensor.

20. The apparatus of claim 1, wherein said at least one second unit includes at least one signal generating component which is an analog sensor.

21. The apparatus of claim 1, wherein said at least one second unit includes at least one signal generating component which is a switch.

22. The apparatus of claim 1, wherein said at least one second unit includes a signal generating component which is responsive to the actuation of a brake of the motor vehicle.

23. The apparatus of claim 1, wherein said at least one second unit includes a signal generating component which is responsive to the actuation of a switch denoting the position of a mobile door of the motor vehicle.

24. The apparatus of claim 1, wherein said at least one second unit includes a signal generating component which is responsive to a change in the condition of an activatable and deactivatable alarm system in the motor vehicle.

25. The apparatus of claim 1, wherein said at least one second unit includes a signal generating component which is responsive to a change in the condition of a switch associated with a seat in the motor vehicle.

26. The apparatus of claim 1, wherein said at least one second unit includes a signal generating component which is responsive to changes in the position of a mobile gas pedal in the motor vehicle.

27. The apparatus of claim 1, wherein said at least one second unit includes a signal generating component which is responsive to changes in the condition of at least one adjustable light in the motor vehicle.

28. The apparatus of claim 1, wherein said at least one second unit includes a signal generating component which is responsive to changes in the condition of a headlamp flasher in the motor vehicle.

29. The apparatus of claim 1, wherein said at least one second unit includes a signal generating component which is responsive to changes in the condition of a horn in the motor vehicle.

30. The apparatus of claim 1, wherein said at least one second unit includes a signal generating component which is responsive to changes in the condition of a wireless communication system in the motor vehicle.

31. The apparatus of claim 1, wherein said at least one second unit includes a signal generating component which is responsive to a change in the condition and/or position of at least one operator-controlled constituent of the motor vehicle.

32. Apparatus for automated actuation of a torque transmitting system in a power train forming part of a motor vehicle and further including a prime mover and a transmission, comprising a signal-receiving actuator for said system, said actuator having an operative condition and an inoperative condition; and means for rendering said actuator operative, including a unit arranged to generate and to transmit to said actuator signals denoting a turning off of an ignition system of the motor vehicle, and means for maintaining said actuator in said operative condition during an interval of finite length following the generation of a signal.

33. The apparatus of claim 32, wherein said system includes an engageable and disengageable clutch.

34. The apparatus of claim 32, wherein said unit includes at least one sensor.

35. The apparatus of claim 32, wherein said unit includes at least one circuit.

36. The apparatus of claim 32, wherein said actuator is arranged to automatically assume said inoperative condition after elapse of said interval.

37. Apparatus for automated actuation of a torque transmitting system in a power train forming part of a motor vehicle and further including a prime mover and a transmission, comprising a signal-receiving actuator for said system, said actuator having an operative condition in which said system is actuatable and an inoperative condition; and means for rendering said actuator operative, including a unit arranged to generate and to transmit to said actuator signals of finite duration denoting an activity of an operator of the motor vehicle, and means for maintaining said actuator in the operative condition only for the duration of a signal.

38. The apparatus of claim 37, wherein said system includes at least one engageable and disengageable clutch.

39. The apparatus of claim 37, wherein said unit includes at least one sensor.

40. The apparatus of claim 37, wherein said unit includes at least one circuit.

41. Apparatus for automated actuation of a torque transmitting system in a power train forming part of a motor vehicle and further including a prime mover and a transmission, comprising a signal-receiving actuator for said system, said actuator having an operative condition in which said system is actuatable and an inoperative condition; and means for rendering said actuator operative, including a unit arranged to generate and to transmit to said actuator signals denoting an activity of an operator of the motor vehicle, and means for maintaining said actuator in said operative condition during an interval of finite length following the generation of a signal.

42. The apparatus of claim 41, wherein said system comprises at least one engageable and disengageable clutch.

43. The apparatus of claim 41, wherein said unit comprises at least one sensor.

44. The apparatus of claim 41, wherein said unit includes at least one circuit.

45. Apparatus for automated actuation of a torque transmitting system in a power train forming part of a motor vehicle and further including a prime mover and a transmission, comprising a signal-receiving actuator for said system, said actuator having an operative condition and an inoperative condition; and means for rendering said actuator operative, including at least one unit arranged to generate and to transmit to said actuator first and second signals denoting first and second activities of an operator of the motor vehicle, and means for maintaining said actuator in said operative condition for an interval of limited duration in response to the generation of a first signal and in the absence of generation of a second signal during said interval.

46. Apparatus for automated actuation of an engageable and disengageable torque transmitting system in a power train forming part of a motor vehicle and further including a prime mover and a transmission having a plurality of gears including a neutral gear and means for shifting the transmission into a selected gear, comprising a signal-receiving actuator for engaging and disengaging said system, said actuator having an operative condition and an inoperative condition; and operating means for said actuator, including a unit arranged to generate and to transmit to said actuator signals denoting the selected gear of the transmission, and means for maintaining said actuator in said operative condition, in which said system is engaged, in response to a signal denoting a selected gear other than neutral, and for maintaining said actuator in said inoperative condition, in which said system is disengaged, in response to a signal denoting that the selected gear is said neutral gear.

47. Apparatus for automated actuation of an engageable and disengageable torque transmitting system in a power train forming part of a motor vehicle and further including a prime mover and a transmission shiftable into a plurality of gears and having operator-controlled mobile means for shifting the transmission into a selected gear, comprising a signal-receiving actuator for said system, said actuator having an operative condition and an inoperative condition; and operating means for said actuator including a unit arranged to generate and to transmit to said actuator signals denoting the extent of movement of said shifting means by the operator of the motor vehicle, means for analyzing said signals to ascertain whether or not the extent of movement of said shifting means is indicative of an intent by the operator to shift the transmission into a different gear, and means for maintaining said actuator in said operative condition for an interval of finite length when an analyzed signal is indicative of an intent to shift the transmission into a different gear, said actuator being arranged to effect a disengagement of said system at least during a portion of said interval when the analyzed signal is indicative of said intent.

48. Apparatus for automated actuation of an engageable and disengageable torque transmitting system in a power train forming part of a motor vehicle and further including a prime mover and a transmission shiftable into a plurality of gears and having operator-controlled means for shifting said transmission into a selected gear in response to the application by an operator of the motor vehicle of a force having a predetermined magnitude, comprising a signal-receiving actuator for said system, said actuator having an operative condition and an inoperative condition; and operating means for said actuator, including at least one unit arranged to generate and to transmit to said actuator signals denoting the magnitude of a force being applied by the operator to said shifting means, means for analyzing said signals to ascertain whether or not the magnitude of the applied force at least matches said predetermined magnitude, and means for maintaining said actuator in said operative condition for an interval of finite length when an analyzed signal denotes a force having a magnitude at least matching said predetermined magnitude, said actuator being arranged to effect a disengagement of said system at least during a portion of said interval when the analyzed signal is indicative that the magnitude of the applied force at least matches said predetermined magnitude.

49. Apparatus for automated actuation of an engageable and disengageable torque transmitting system in a power train forming part of a motor vehicle and further including a prime mover and a transmission shiftable into a plurality of gears and having operator-controlled mobile means for shifting into a selected gear, comprising a signal-receiving actuator for said system, said actuator having an operative condition and an inoperative condition; and operating means for said actuator, including at least one unit arranged to generate and transmit to said actuator signals denoting the movement of said shifting means by an operator of the motor vehicle, said actuator being responsive to said signals after elapse of a predetermined interval of generation of said signals.

50. Apparatus for automated actuation of an engageable and disengageable torque transmitting system in a power train forming part of a motor vehicle and further including a prime mover and a transmission shiftable into a plurality of gears and having operator-controlled means for shifting the transmission into a selected gear in response to the application by an operator of the motor vehicle of a force having a predetermined magnitude, comprising a signal-receiving actuator for said system, said actuator having an operative condition and an inoperative condition; and operating means for said actuator, including at least one unit arranged to generate and to transmit to said actuator signals denoting the magnitude of the force being applied to said shifting means by the operator, said actuator being responsive to said signals after elapse of a predetermined interval of the generation of a signal.

51. Apparatus for automated actuation of an engageable and disengageable torque transmitting system in a power train forming part of a motor vehicle and further including a prime mover and a transmission having a plurality of different gears including a neutral gear and additional gears, and vehicle operator-controlled means for shifting into a selected gear, comprising a signal-receiving actuator for said system, said actuator having an operative condition and an inoperative condition; and operating means for said actuator, including at least one unit arranged to generate and to transmit to said actuator first signals denoting the selected gear and second signals denoting the existence of an intent on the part of the operator to shift into a selected gear, said actuator being arranged to disengage said system in response to said second signals when the first signal then being transmitted to said actuator denotes that the selected gear is one of said additional gears.

52. Apparatus for automated actuation of an engageable and disengageable torque transmitting system in a power train forming part of a motor vehicle and further including a prime mover and a transmission having a plurality of gears including a neutral gear and vehicle-operator controlled means for shifting into a selected gear, comprising a signal-receiving actuator for said system, said actuator having an operative condition and an inoperative condition; and operating means for said actuator, including at least one first unit arranged to generate and to transmit to said actuator first signals denoting the selected gear, and at least one second unit arranged to generate and to transmit to said actuator second signals denoting an intent on the part of an operator of the vehicle to shift from said neutral gear into another of said plurality of gears.

53. Apparatus for automated actuation of an engageable and disengageable torque transmitting system in a power train forming part of a motor vehicle and further including a prime mover and a transmission, comprising a signal-receiving actuator for said system, said actuator having an operative condition and an inoperative condition; and operating means for said actuator, including at least one first unit arranged to generate and to transmit to said actuator first signals denoting a turning off of an ignition system of the vehicle, and at least one second unit arranged to generate and to transmit to said actuator second signals denoting an activity of an operator of the motor vehicle, said actuator being arranged to assume or remain in said operative condition during a first interval of time following the generation of a first signal, and to assume or remain in said operative condition during a second interval of time following the generation of a second signal, the duration of one of said intervals being different from the duration of the other of said intervals.

54. Apparatus for automated actuation of an engageable and disengageable torque transmitting system in a power train forming part of a motor vehicle and further including a prime mover and a transmission, comprising a signal-receiving actuator for said system, said actuator having an operative condition and an inoperative condition; and operating means for said actuator, including a plurality of units each arranged to generate and to transmit to said actuator signals denoting a different activity of an operator of the motor vehicle, said actuator being arranged to remain in one of said conditions thereof for one of a plurality of intervals of time following the generation of a signal by one of said units.

55. The apparatus of claim 54, wherein said intervals have identical durations.

56. The apparatus of claim 54, wherein at least two of said intervals have different durations.

57. The apparatus of claim 54, wherein said actuator is arranged to remain in a predetermined one of said operative and inoperative conditions in response to the generation of a signal by any one of said plurality of units.

58. The apparatus of claim 54, wherein said actuator is arranged to remain in said operative condition in response to the generation of a signal by one of said units and to remain in said inoperative condition in response to the generation of a signal by another of said units.

59. Apparatus for automated actuation of an engageable and disengageable torque transmitting system in a power train forming part of a motor vehicle and further including a prime mover and a transmission, comprising a signal-receiving actuator for said system, said actuator having an operative condition and an inoperative condition; and operating means for said actuator including at least one first unit arranged to generate and to transmit to said actuator first signals denoting a change in the condition of the vehicle, and at least one second unit arranged to generate and to transmit to said actuator second signals denoting an activity of an operator of the motor vehicle, said actuator being arranged to maintain said system in the engaged condition after the elapse of an interval of finite length following the generation of one of said signals and to become inoperative after the elapse of such interval.

60. Apparatus for automated actuation of an engageable and disengageable torque transmitting system in a power train forming part of a motor vehicle and further including a prime mover and a transmission, comprising a signal-receiving actuator for said system, said actuator having an operative condition and an inoperative condition; and operating means for said actuator, including at least one first unit arranged to generate and to transmit to said actuator first signals denoting a change in the condition of the motor vehicle, and at least one second unit arranged to generate and to transmit to said actuator second signals denoting an activity of an operator of the motor vehicle, said actuator being arranged to maintain said system in the engaged condition after the elapse of an interval of finite length following the generation of one of said signals and to automatically become inoperative after the elapse of such interval.

61. Apparatus for automated actuation of an engageable and disengageable torque transmitting system in a power train forming part of a multiple-condition motor vehicle and further including a prime mover and a transmission, comprising a signal-receiving actuator for said system, said actuator having an operative condition and an inoperative condition and including an electric circuit, means for storing information pertaining to operation of the motor vehicle and means for retrieving said information; and operating means for said actuator, including at least one first unit arranged to generate and to transmit to said actuator first signals denoting a change in the condition of the motor vehicle, and at least one second unit arranged to generate and to transmit to said actuator second signals denoting an activity of an operator of the motor vehicle, said actuator being arranged to assume said operative condition from an inoperative condition in response to the generation by said at least one second unit of said second signals.

62. A method of utilizing an apparatus which is designed for automated actuation of a torque transmitting system in a power plant forming part of a multiple-condition motor vehicle and further including a prime mover and a transmission and which apparatus further includes a signal-receiving actuator for the torque transmitting system, the actuator including an electric circuit and having operative and inoperative conditions, comprising the steps of rendering the actuator operative in response to a first signal denoting a change in the condition of the motor vehicle; and rendering the actuate or operative, in the absence of a first signal, in response to a second signal denoting an activity of an operator of the motor is vehicle.

63. The method of claim 62, wherein said change in the condition of the motor vehicle includes a turning on of an ignition system for the prime mover.

64. The method of claim 62, wherein said activity includes a manipulation of the transmission.

65. The method of claim 62, wherein said of an operator includes at least one of: actuation of a horn, actuation of a light emitting device, actuation of an alarm system, actuation of a brake, actuation of a gas pedal, actuation of a device for monitoring a seat in the motor vehicle, actuation of a device for monitoring the position of a mobile door in the motor vehicle, actuation of a wireless communication system, and actuation of a device for monitoring a headlamp flasher in the motor vehicle.

66. The method of claim 62, further comprising the step of maintaining the actuator in the operative condition for a predetermined interval of time upon generation of one of said signals.

67. The method of claim 62, further comprising the step of rendering the actuator inoperative after elapse of a predetermined interval of time following the generation of a first signal.

68. The method of claim 62, further comprising the step of rendering the actuator inoperative after elapse of a predetermined interval of time following the generation of a second signal.

69. Apparatus for automated actuation of an engageable and disengageable torque transmitting system in a power train forming part of a motor vehicle and further including a prime mover and a transmission, comprising a signal-receiving actuator for said system, said actuator having an operative condition and an inoperative condition; and operating mean s for said actuator, including a plurality of units each arranged to generate and to transmit to said actuator signals denoting a different activity of an operator of the motor vehicle, said actuator being arranged to assume and remain in one of said conditions thereof for one of a plurality of intervals of time following the generation of a signal by one of said units.

70. The apparatus of claim 69, wherein said intervals have identical durations.

71. The apparatus of claim 69, wherein at least two of said intervals have different durations.

72. The apparatus of claim 69, wherein said actuator is arranged to assume and remain in a predetermined one of said operative and inoperative conditions in response to the generation of a signal by any one of said plurality of units.

73. The apparatus of claim 69, wherein said actuator is arranged to assume and remain in said operative condition in response to the generation of a signal by one of said units and to assume and remain in said inoperative condition in response to the generation of a signal by another of said units.

* * * * *